(12) United States Patent
Knoll

(10) Patent No.: US 8,412,686 B2
(45) Date of Patent: Apr. 2, 2013

(54) METHOD AND APPARATUS FOR DETERMINING WHETHER A PRIVATE DATA AREA IS SAFE TO PRESERVE

(75) Inventor: Thomas F. Knoll, Ann Arbor, MI (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 13/566,814

(22) Filed: Aug. 3, 2012

(65) Prior Publication Data

US 2012/0323865 A1   Dec. 20, 2012

Related U.S. Application Data

(63) Continuation of application No. 10/993,589, filed on Nov. 19, 2004, now Pat. No. 8,239,352.

(51) Int. Cl.
*G06F 17/30* (2006.01)

(52) U.S. Cl. .................... 707/692

(58) Field of Classification Search .............. None
See application file for complete search history.

(56) References Cited

U.S. PATENT DOCUMENTS

| | | | |
|---|---|---|---|
| 5,619,571 | A | 4/1997 | Sandstrom et al. |
| 5,802,592 | A | 9/1998 | Chess et al. |
| 5,813,009 | A | 9/1998 | Johnson et al. |
| 6,282,313 | B1 | 8/2001 | McCarthy et al. |
| 6,323,899 | B1 | 11/2001 | Roberts |
| 7,111,322 | B2 | 9/2006 | Slick et al. |
| 7,233,356 | B2 | 6/2007 | Nagao |
| 7,480,896 | B2 | 1/2009 | Harry et al. |
| 2002/0080190 | A1 | 6/2002 | Hamann et al. |
| 2002/0130957 | A1 | 9/2002 | Gallagher et al. |
| 2003/0156196 | A1 | 8/2003 | Kato et al. |
| 2003/0161608 | A1 | 8/2003 | Nishijima et al. |
| 2004/0100381 | A1 | 5/2004 | Waters |
| 2004/0162642 | A1 | 8/2004 | Gasper et al. |
| 2004/0169736 | A1 | 9/2004 | Rakvica et al. |
| 2004/0179239 | A1 | 9/2004 | Yamazaki et al. |
| 2004/0189807 | A1 | 9/2004 | Smith |
| 2004/0201688 | A1 | 10/2004 | Wolf |
| 2004/0201751 | A1 | 10/2004 | Bell et al. |
| 2004/0212688 | A1 | 10/2004 | Takano et al. |
| 2004/0212692 | A1 | 10/2004 | Nakami |
| 2004/0236768 | A1 | 11/2004 | Saito |
| 2004/0247308 | A1 | 12/2004 | Kawade |
| 2004/0252219 | A1 | 12/2004 | Seki |
| 2005/0062856 | A1 | 3/2005 | Matsushita |
| 2005/0192924 | A1 | 9/2005 | Drucker et al. |

FOREIGN PATENT DOCUMENTS

JP     2004342192     11/2001

OTHER PUBLICATIONS

"Exchangeable Image File Format for Digital Still Cameras," Exif Version 2.2, JEITA CP-3451, Standard of Japan Electronics and Information Technology Industries Association, 2002, 154pgs.

*Primary Examiner* — Bai D. Vu
(74) *Attorney, Agent, or Firm* — Wolfe-SBMC

(57) ABSTRACT

A system may configure a safety-tag that indicates whether a private data area is safe to preserve. During operation, the system receives a file with a private data area. Specifically, in one embodiment, the private data area is contained within an Exchangeable Image File (EXIF) MakerNote tag, which allows makers of EXIF writers to record any desired information. Next, the system determines whether the private data area is safe to preserve. If the private data area is safe to preserve, the system configures a safety-tag to indicate that the private data area is safe to preserve. Otherwise, if the private data area is not safe to preserve, the system configures the safety-tag to indicate that the private data is not safe to preserve. Specifically, in one embodiment, the safety-tag is a Digital Negative (DNG) MakerNoteSafety tag.

20 Claims, 4 Drawing Sheets

METHOD AND APPARATUS FOR DETERMINING WHETHER A PRIVATE DATA AREA IS SAFE TO PRESERVE

This application a Continuation of U.S. patent application Ser. No. 10/993,589, filed Nov. 19, 2004 now U.S. Pat. No. 8,239,352, which is hereby incorporated by reference in its entirety.

BACKGROUND

1. Field of the Invention

The present invention is related to data storage. More specifically, the present invention is related to determining whether a private data area in a file is safe to preserve to storage.

2. Related Art

As digital cameras and associated software applications proliferate, a dizzying number of file formats are emerging. Supporting all of them in every application has become impractical. As a result, a number of file format standards have been proposed.

Typically, file formats allow a user to store "private data" in a file. This is usually achieved by specifying a "private data area" in the file which can be utilized by users, such as camera manufacturers, to store desired data. For example, Extensible Image Format (EXIF) uses a MakerNote tag to store private data.

Note that a file is typically handled by a variety of applications (or systems). But, the private data area is usually understood only by the application (or system) that wrote the private data. As a result, an application (or a system) that does not understand the private data can corrupt the private data area while trying to preserve it. This can cause subsequent applications or systems that use the file to malfunction which can potentially have disastrous consequences.

Hence there is a need for a method and apparatus for determining whether a private data area in a file is safe to preserve.

SUMMARY

One embodiment of the present invention provides a system that configures a safety-tag that indicates whether a private data area is safe to preserve. During operation, the system receives a file with a private data area. Specifically, in one embodiment of the present invention, the private data area is contained within an Exchangeable Image File (EXIF) MakerNote tag, which allows makers of EXIF writers to record any desired information. Next, the system determines whether the private data area is safe to preserve. If the private data area is safe to preserve, the system configures a safety-tag to indicate that the private data area is safe to preserve. Otherwise, if the private data area is not safe to preserve, the system configures the safety-tag to indicate that the private data is not safe to preserve. Specifically, in one embodiment of the present invention, the safety-tag is a Digital Negative (DNG) MakerNoteSafety tag.

In a variation on this embodiment, if the private data area is safe to preserve, the system can perform a variety of operations. For example, the system can translate the file into another format; the system can modify the file; the system can move the private data area to another location within the file; or the system can move the private data area to another file. Note that the system preserves the private data area during all of these operations.

In a variation on this embodiment, if the private data area is not safe to preserve, the system can perform a variety of operations. For example, the system can decide not to preserve the private data area; the system can warn the user that the private data area is not safe to preserve; or the system can decide to preserve the private data area in spite of it being not safe to preserve.

In a variation on this embodiment, while determining whether the private data area is safe to preserve, the system determines whether all offsets within the private data area are relative-offsets that are relative to a location within the private data area, and which do not point to locations outside of the private data area.

In a variation on this embodiment, while determining whether the private data area is safe to preserve, the system determines whether all of the data within the private data area is byte-order independent.

Another embodiment of the present invention provides a system that determines whether a private data area is safe to preserve. During operation, the system receives a file containing a private data area and a safety-tag which indicates whether the private data area is safe to preserve. The system then reads the safety-tag to determine whether the private data area is safe to preserve. Note that in one embodiment of the present invention, the private data area is contained within an Exchangeable Image File (EXIF) MakerNote tag, which allows makers of EXIF writers to record any desired information. Furthermore, in one embodiment of the present invention, the safety-tag is a Digital Negative (DNG) MakerNoteSafety tag.

DETAILED DESCRIPTION

Figure 1:
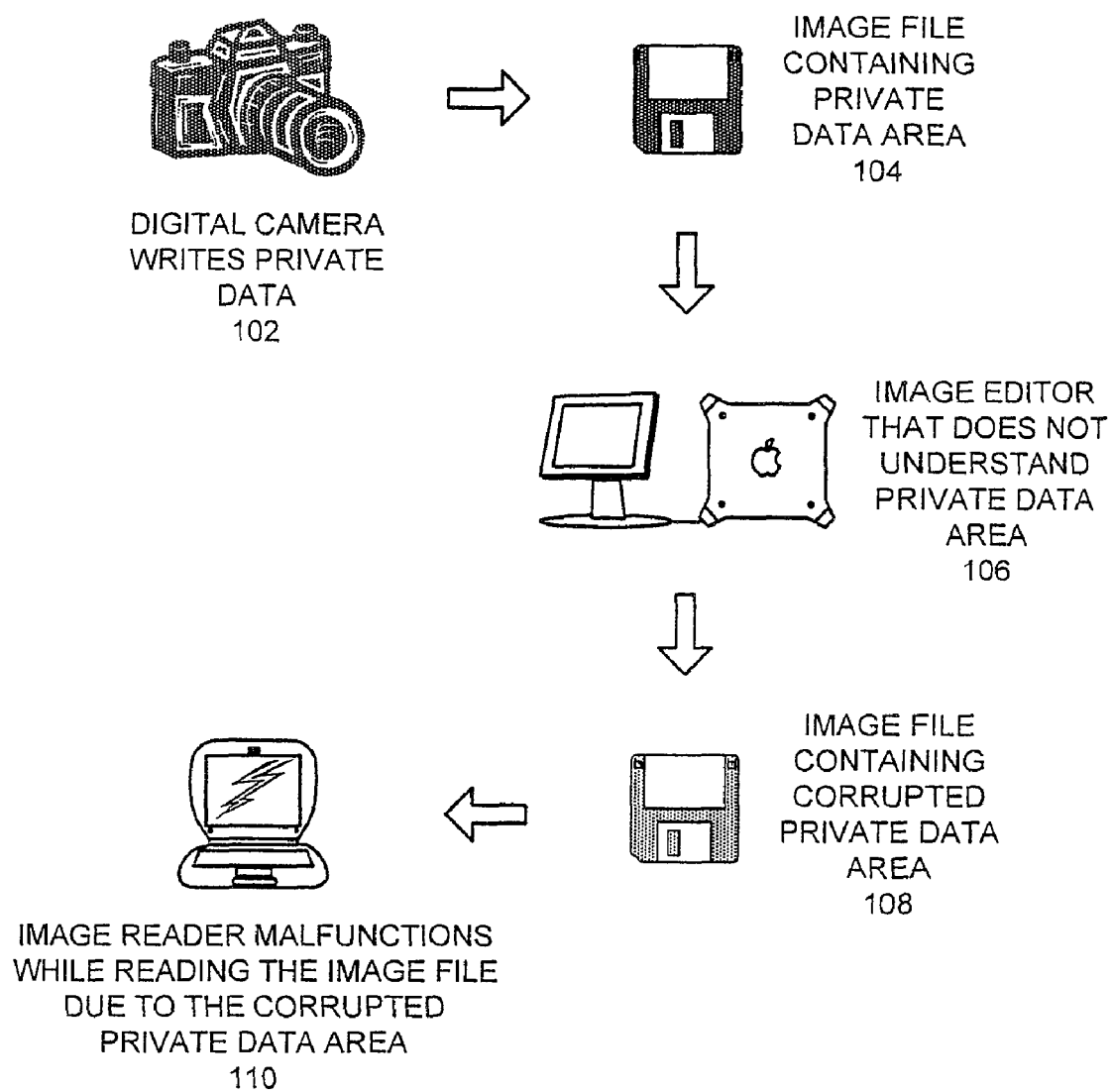
FIG. 1 illustrates how a corrupted private data area can cause an application (or a system) to malfunction in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

File Formats

As digital cameras and associated software applications proliferate, a dizzying number of file formats are emerging. Supporting all of them in every application has become impractical. As a result, a number of file format standards have been proposed.

Digital Negative (DNG) is one such standard. DNG is designed for storing "raw image data". Digital cameras usually do not directly capture color images that can be read by a computer. Instead, an imaging device behind the lens typically captures grayscale images, with color filters over some of the grayscale images so that they only record light of a particular color. The digital camera then takes this "raw image data", assigns color to the pixels based on the filters in place, combines it with user provided settings, and creates a color image. Then it compresses the image (e.g., using JPEG compression) and sends it to a computer.

An increasing number of photographers want to use the raw image data instead of using the processed file (e.g., JPEG file). This is because the raw image data offers them increased flexibility, quality, and control over the final color image. Before DNG, there was no accepted standard for storing raw image data. Not only did different camera manufacturers have their own file formats, but often a single manufacturer had multiple file formats. As a result, photographers were unable to easily use raw image data. DNG allows photographers to conveniently use raw image data because DNG-compatible devices and applications interoperate seamlessly.

Note that a file is simply a stream of data. Consequently, a standardized file format, such as DNG, usually specifies some form of metadata that enables an application (or a system) to interpret the data. Specifically, the metadata specified in DNG contains all of the information that an application (or a system) needs to convert an image file, even if the application was not designed for the specific imaging device. This metadata is what makes DNG so powerful and is the reason why DNG-compatible devices and applications can interoperate seamlessly.

Typically, file formats allow a user to store "private data" in a file. This is usually achieved by specifying a private data area in the file which users can utilize to store desired data. For example, Extensible Image Format (EXIF) uses a MakerNote tag to store private data.

Unfortunately, an application (or a system) that does not understand the private data can corrupt the private data area while trying to preserve it. This can cause subsequent applications to malfunction while using the file, which can potentially have disastrous consequences.

Private Data Areas and Safety-Tags

FIG. 1 illustrates how a corrupted private data area can cause an application (or a system) to malfunction in accordance with an embodiment of the present invention.

A file writer, such as digital camera 102, can write private data to a file, such as image file 104, which contains a private data area. Next, the file 104 can be used by an application (or a system), such as image editor 106, which does not understand the private data. This application (image editor 106) may corrupt the private data area while trying to preserve it in a file, such as image file 108, which now contains a corrupted private data area. This can subsequently cause image reader 110 to malfunction when it uses corrupted data from the private data area in image file 108.

Note that a private data area can be corrupted by an application (or a system) for various reasons. For example, absolute offsets in the private data can get corrupted when an application or a system moves the private data area to a new location within the file, or when the application moves the private data area to another file. Similarly, an application (or a system) can save the private data area in a different byte order or file format.

In one embodiment of the present invention, the system uses a safety-tag to indicate whether the private data area is safe to preserve or not. Specifically, in one embodiment of the present invention, the safety-tag is a DNG MakerNoteSafety tag.

Figure 2:
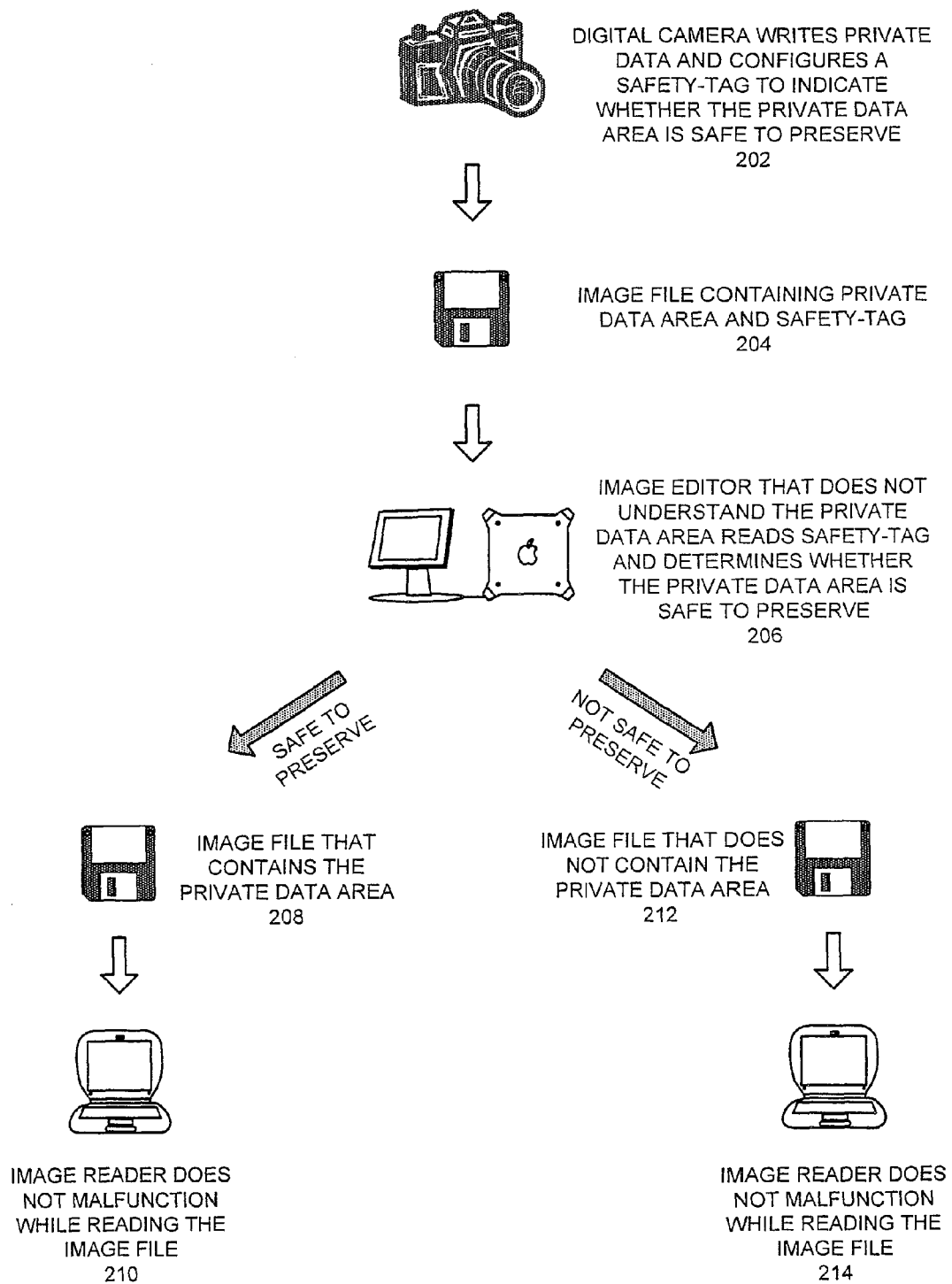
FIG. 2 illustrates how a safety-tag, which indicates whether the private data area is safe to preserve, can be used by an application (or a system) in accordance with an embodiment of the present invention.

FIG. 2 illustrates how a safety-tag, which indicates whether the private data area is safe to preserve, can be used by an application (or a system) in accordance with an embodiment of the present invention.

A file writer, such as digital camera 202, configures a safety-tag and stores it with the private data in a file, such as image file 204. Next, the file 204 is used by an application (or a system), such as image editor 206, which does not understand the private data. Image editor 206 then reads the safety-tag to determine whether the private data area is safe to preserve.

If the private data is safe to preserve, image editor 206 can preserve the private data area in a file, such as image file 208, without corrupting the private data area. Note that the image editor 206 can also store the safety-tag along with the image file 208. Subsequently, image reader 210 can safely use image file 208, which contains the uncorrupted private data area.

On the other hand, if the private data area is not safe to preserve, image editor 206 can decide not to preserve the private data area in a file, such as image file 212. Subsequently, image reader 214 can safely use image file 212, which does not contain the private data area.

Note that, in the absence of the safety-tag, image editor 206 could have erroneously preserved the private data area because it would not have known whether the private data area was safe to preserve. As a result, image editor 206 could have corrupted the private data area while preserving it to a file, which could have caused a subsequent image reader to malfunction. Hence, a safety-tag is very useful because it can prevent an application (or a system) from malfunctioning due to a corrupted private data area.

Process of Configuring a Safety-Tag

Figure 3:
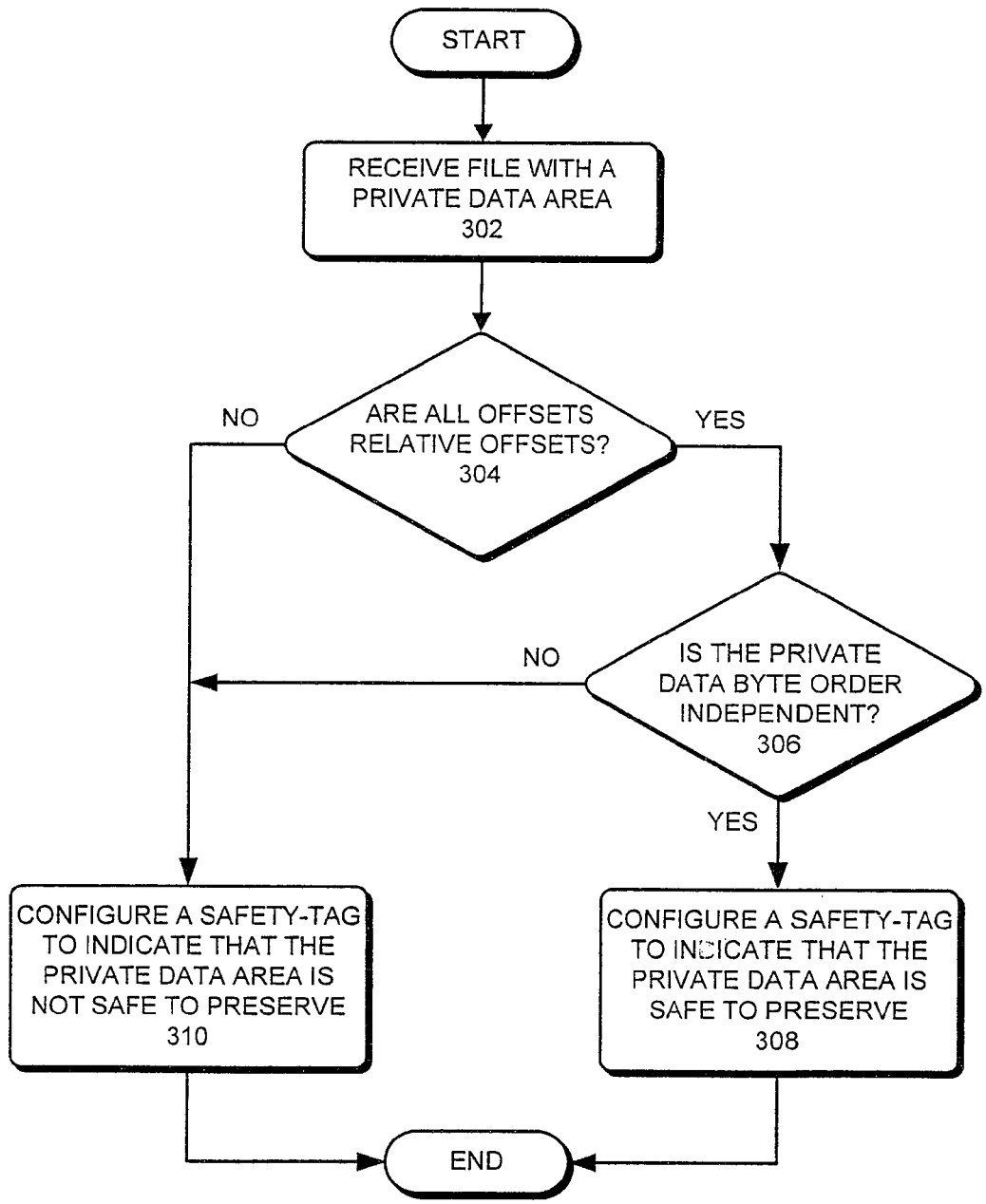
FIG. 3 presents a flowchart that illustrates the process of configuring a safety-tag in accordance with an embodiment of the present invention.

FIG. 3 presents a flowchart that illustrates the process of configuring a safety-tag in accordance with an embodiment of the present invention.

The process starts by receiving a file with a private data area (step 302). It will be obvious to one skilled in the art that a file can contain a variety of private data areas. Moreover, it will be evident to one skilled in the art that a private data area can be specified in a variety of ways. In one embodiment of the present invention, the private data area can be contained within an Exchangeable Image File (EXIF) MakerNote tag, which allows makers of EXIF writers to record any desired information.

Next, the system determines whether the private data area is safe to preserve. Specifically, the system can first check whether all offsets within the private data area are relative-offsets that are relative to a location within the private data area, and which do not point to locations outside of the private data area (step 304).

If all offsets within the private data area are relative-offsets that are relative to a location within the private data area, and which do not point to locations outside of the private data area, the system then determines whether all of the data within the private data area is byte-order independent (step 306). If so, the system configures a safety-tag to indicate that the private data area is safe to preserve (step 308).

Otherwise, if the private data contains an offset that is not a relative-offset, or if it contains an offset that is relative to a location outside the private data area, or if it contains an offset which points to a location outside of the private data area, or if it contains data that is not byte-order independent, the system configures a safety-tag to indicate that the private data area is not safe to preserve (step 310).

It will be evident to one skilled in the art that a safety-tag can be specified in a variety of ways. In one embodiment of the present invention, the safety-tag is a Digital Negative (DNG) MakerNoteSafety tag.

Note that if the system determines that a private data in a file is safe to preserve, it can preserve the private data area while performing a variety of operations. For example, the system can preserve the private data area while translating the file into another format, or while modifying the file. Moreover, the system can move the private data area to another location within the file, or it can move the private data area to another file.

On the other hand, if the system determines that a private data in a file is not safe to preserve, it can take a variety of counter-measures. For example, the system can decide not to preserve the private data area while translating or modifying the file. Similarly, the system can warn the user that the private data area is not safe to preserve. Furthermore, in one embodiment of the present invention, the system can decide to preserve the private data area in spite of it being not safe to preserve.

Process of Reading a Safety-Tag

Figure 4:
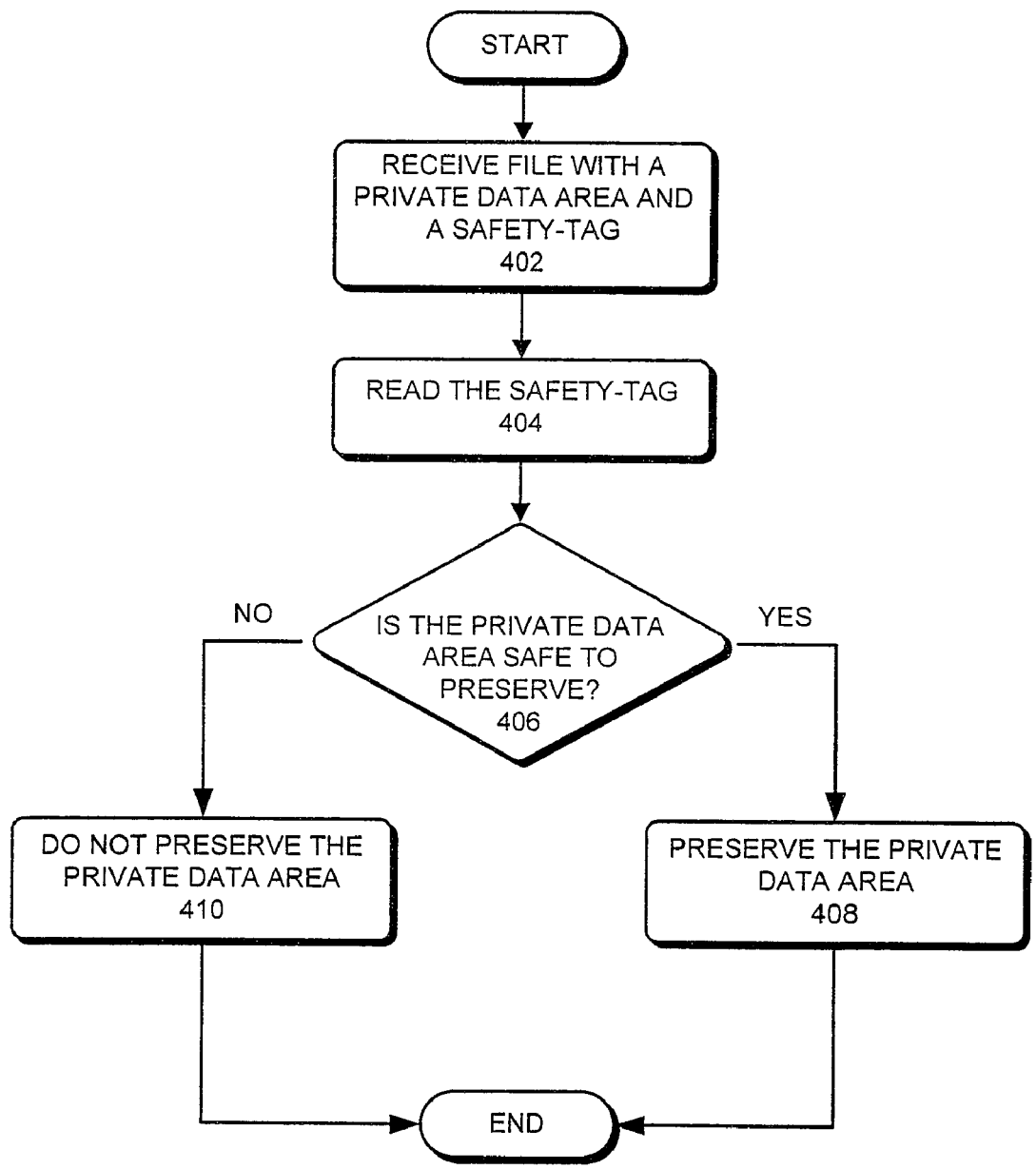
FIG. 4 presents a flowchart that illustrates the process of reading a safety-tag to determine whether a private data area is safe to preserve in accordance with an embodiment of the present invention.

FIG. 4 presents a flowchart that illustrates the process of reading a safety-tag to determine whether a private data area is safe to preserve or not in accordance with an embodiment of the present invention.

The process starts by receiving a file with a private data area and a safety-tag (step 402).

Next, the system reads the safety-tag (step 404).

The system then uses the safety-tag to determine whether the private data are is safe to preserve or not (step 406).

If the private data area is safe to preserve, the system then preserves the private data area (step 408). It will be readily apparent to one skilled in the art that the private data area can be preserved during a variety of operations. For example, the system can preserve the private data area while translating the file into another format, or while modifying the file. Moreover, the system can move the private data area to another location within the file, or it can move the private data area to another file.

On the other hand, if the private data is not safe to preserve, the system does not preserve the private data area (step 410). Specifically, the system can decide not to preserve the private data area while translating or modifying the file. Similarly, the system can warn the user that the private data area is not safe to preserve. Moreover, the system can decide not to move the private data area to another location within the file or to another file. Furthermore, in another embodiment of the present invention, the system can decide to preserve the private data area in spite of it being not safe to preserve.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method, comprising:
   determining whether preserving a private data area of an image file could result in corrupting the private data area; and
   in response to said determining, configuring a safety-tag to indicate whether preserving the private data area of the image file could result in corrupting the private data area.

2. The method of claim 1, wherein the image file has a file format including a raw image data portion and a metadata portion.

3. The method of claim 2, wherein the metadata portion includes metadata that enables an application to interpret the image file.

4. The method of claim 1, wherein the image file is in Digital Negative (DNG) format, and wherein the safety-tag is a Digital Negative (DNG) tag.

5. The method of claim 1, wherein said determining includes determining whether data within the private data area is byte-order independent.

6. The method of claim 1, wherein said determining includes determining whether an offset within the private data area is a relative offset that is relative to a location within the private data area.

7. The method of claim 1, wherein the safety-tag is usable to determine which one of a plurality of operations is available to perform on the image file.

8. A non-transitory computer-readable storage medium storing program instructions, wherein the program instructions are computer-executable to implement:
   reading a safety-tag that indicates whether preserving a private data area of an image file could result in corrupting the private data area; and
   performing an operation on the image file, wherein the operation is dependent on whether preserving the private data area of the image file could result in corrupting the private data area.

9. The non-transitory computer-readable storage medium of claim 8, wherein the safety-tag indicates that preserving the private data area of the image file could not result in corrupting the private data area, and wherein performing the operation on the image file results in preserving the private data area.

10. The non-transitory computer-readable storage medium of claim 9, wherein the operation includes modifying the image file.

11. The non-transitory computer-readable storage medium of claim 8, wherein the safety-tag indicates that preserving the private data area of the image file could result in corrupting the private data area, and wherein performing the operation on the image file does not result in preserving the private data area.

12. The non-transitory computer-readable storage medium of claim 8, wherein the safety-tag indicates that preserving the private data area of the image file could result in corrupting the private data area, wherein the program instructions are further computer-executable to implement:
   generating a message that preserving the private area data could result in corrupting the private data area.

13. The non-transitory computer-readable storage medium of claim 8, wherein the image file is in DNG format.

14. The non-transitory computer-readable storage medium of claim 8, wherein a determination of whether preserving the private data area of the image file could result in corrupting the private data area is based, at least in part, on whether data within the private data area is byte-order independent.

15. The non-transitory computer-readable storage medium of claim 8, wherein a determination of whether preserving the private data area of the image file could result in corrupting the private data area is based, at least in part, on whether an offset within the private data area is a relative offset that is relative to a location within the private data area.

16. An apparatus, comprising:
    imaging device configured to:
        store an image file for an image captured by the imaging device, wherein the image file includes a private data area; and
        configure a safety-tag to indicate whether preserving the private data area of the image file could result in corrupting the private data area.

17. The apparatus of claim 16, wherein the image file is in DNG format, and wherein the safety-tag is a Digital Negative (DNG) tag.

18. The apparatus of claim 16, wherein the private data area is stored in an Exchangeable Image File (EXIF) MakerNote tag.

19. The apparatus of claim 16, wherein the image file is stored as raw image data.

20. The apparatus of claim 16, wherein the safety-tag is usable to determine which one of a plurality of operations is available to perform on the image file.

* * * * *